(12) United States Patent
Imana

(10) Patent No.: US 10,013,394 B2
(45) Date of Patent: Jul. 3, 2018

(54) SYSTEM AND METHOD FOR RE-MARGINATING DISPLAY CONTENT

(71) Applicant: Rakuten Kobo Inc., Toronto (CA)

(72) Inventor: Juan Ernesto Salas Imana, Toronto (CA)

(73) Assignee: RAKUTEN KOBO INC., Toronto (CA)

( * ) Notice: Subject to any disclaimer, the term of this patent is extended or adjusted under 35 U.S.C. 154(b) by 660 days.

(21) Appl. No.: 14/536,548

(22) Filed: Nov. 7, 2014

(65) Prior Publication Data

US 2016/0132464 A1    May 12, 2016

(51) Int. Cl.
*G06F 17/21*    (2006.01)
*H04L 29/08*    (2006.01)
*G06F 3/0488*    (2013.01)
*G06F 3/0483*    (2013.01)

(52) U.S. Cl.
CPC .......... *G06F 17/211* (2013.01); *G06F 3/0483* (2013.01); *G06F 3/0488* (2013.01); *H04L 67/10* (2013.01); *G06F 17/217* (2013.01)

(58) Field of Classification Search
CPC ..... G06F 17/211; G06F 17/217; G06F 3/0483
USPC ....................................................... 715/244
See application file for complete search history.

(56) References Cited

U.S. PATENT DOCUMENTS

| | | | | |
|---|---|---|---|---|
| 8,519,971 | B1* | 8/2013 | Mackraz | G06F 3/147 313/504 |
| 2002/0059350 | A1* | 5/2002 | Iwema | G06F 3/03545 715/234 |
| 2012/0032979 | A1* | 2/2012 | Blow | G06F 1/1626 345/647 |

* cited by examiner

*Primary Examiner* — Andrea Leggett
(74) *Attorney, Agent, or Firm* — Oblon, McClelland, Maier & Neustadt, L.L.P.

(57) ABSTRACT

A method and system for re-marginating content displayed on a display screen of a computing device when upon receiving indication of an object superposed on the display screen content, a "handedness" preference of the reader/observer can be determined. In one embodiment, the content comprises display of one page in a series of digitally constructed pages. A keep out margin is calculated based on position of the object. Content is then re-flowed or line-wrapped about that keep out margin, to counteract any obscuration of displayed content. The line-wrapping of the content around the keep out margin is accomplished while maintaining a plurality of text attributes of the content. The line-wrapping forces reconstruction of a next one of the series of pages for display.

21 Claims, 4 Drawing Sheets

SYSTEM AND METHOD FOR RE-MARGINATING DISPLAY CONTENT

TECHNICAL FIELD

Examples described herein relate to a system and method for re-margination of content rendered on a display screen, pertaining to digital reading of content displayed thereon.

BACKGROUND

An electronic personal display is a mobile computing device that displays information to a user. While an electronic personal display may be capable of many of the functions of a personal computer, a user can typically interact directly with an electronic personal display without the use of a keyboard that is separate from, or coupled to, but distinct from the electronic personal display itself. Some examples of electronic personal displays include mobile digital devices/tablet computers and electronic readers (e-readers) such (e.g., Apple iPad®, Microsoft® Suurface™, Samsung Galaxy Tab® and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, Kobo Aura H2O and the like).

Some electronic personal display devices are purpose built devices designed to perform especially well at displaying digitally-stored content for reading or viewing thereon. For example, a purpose build device may include a display that reduces glare, performs well in high lighting conditions, and/or mimics the look of text as presented via actual discrete pages of paper. While such purpose built devices may excel at displaying content for a user to read, they may also perform other functions, such as displaying images, emitting audio, recording audio, and web surfing, among others.

Electronic personal displays are among numerous kinds of consumer devices that can receive services and utilize resources across a network service. Such devices can operate applications or provide other functionality that links a device to a particular account of a specific service. For example, the electronic reader (e-reader) devices typically link to an online bookstore, and media playback devices often include applications that enable the user to access an online media electronic library (or e-library). In this context, the user accounts can enable the user to receive the full benefit and functionality of the device.

Yet further, as consumer devices, a feature of "edge-to-edge" display glass is aesthetically very desirable, whereby a conventional device housing or bezel, disposed around the display screen, is dispensed with.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DETAILED DESCRIPTION

Figure 1:
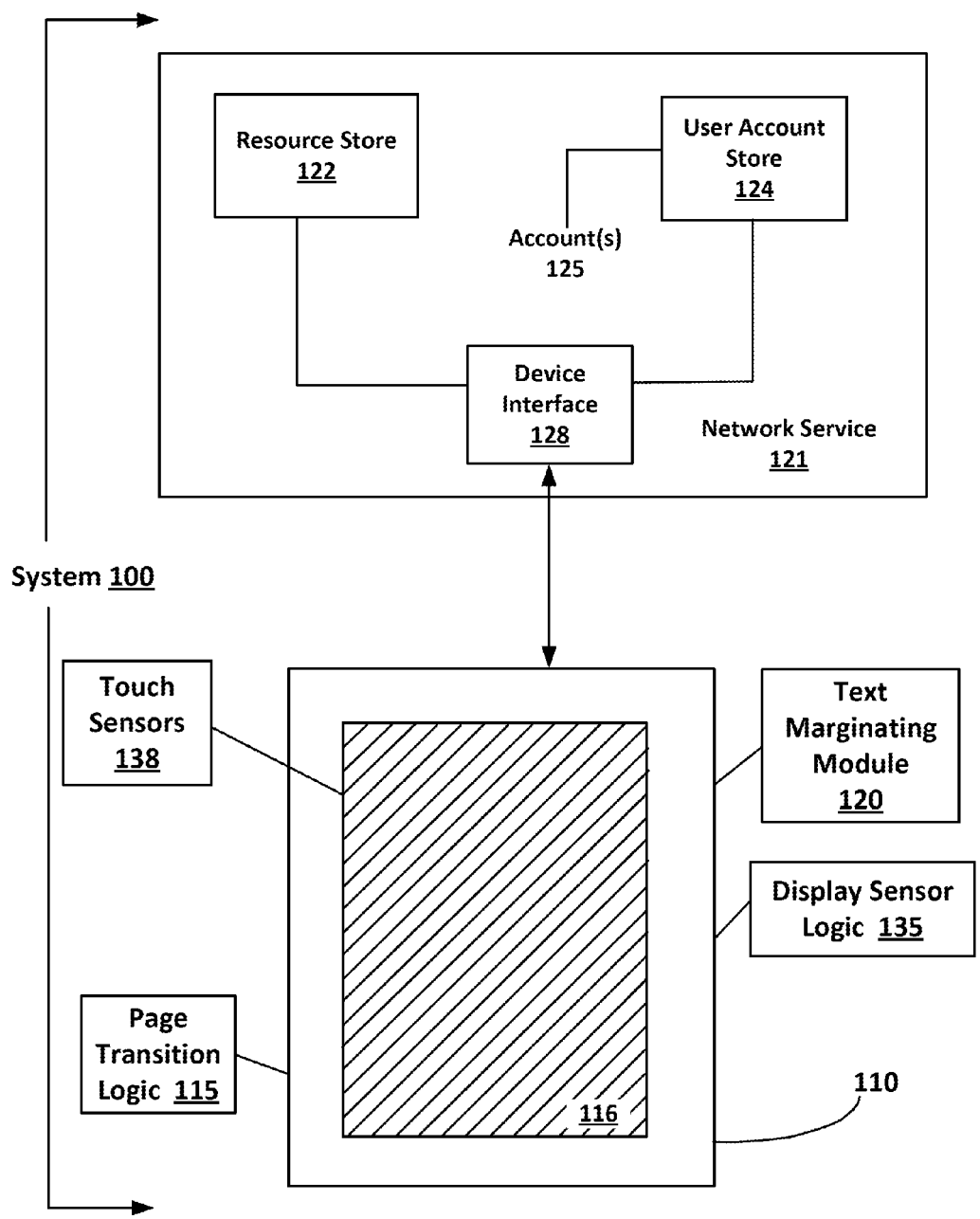
FIG. 1 illustrates a system utilizing applications and providing e-book services on a computing device configured for re-marginating displayed content in a manner that counteracts obscuration thereof according to an embodiment.

As consumer devices, while a feature of "edge-to-edge" display glass is considered aesthetically very pleasing, it necessitates dispensing with the conventional device housing or bezel, disposed around and supporting the display screen for viewing thereon. Another reason in favor of implementing the edge to edge glass feature is that, as mobile device screens become yet smaller and smaller, it would be desirable to display more content per single screen by eliminating or at least minimizing the unusable "dead" areas comprising margins around the periphery of the content. Implementation of the edge to edge display glass feature, however, presents a practical problem for an observer or user, in that given the relatively small form factor of an electronic personal display or mobile computing device, the very act of holding the device itself with a hand typically results in undesirable obscuration of portion(s) of content being displayed.

One or more embodiments described herein may be implemented using programmatic modules or components. A programmatic module or component may include a program, a subroutine, a portion of a program, or software or a hardware component capable of performing one or more stated tasks or functions in conjunction with one or more processors. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be stored on a computer-readable non-transitory medium. In particular, the numerous computing and communication devices shown with embodiments of the invention include processor(s) and various forms of computer memory, including volatile and non-volatile forms, storing data and instructions. Examples of computer-readable mediums include permanent memory storage devices, such as hard drives on personal computers or servers. Other examples of computer storage mediums include portable storage units, such as CD or MD units, flash or solid state memory (such as carried on many cell phones and consumer electronic devices) and magnetic memory. Computers, terminals, network enabled devices (e.g., mobile devices such as cell phones and wearable computers) are all examples of machines and devices that utilize processors, memory, and instructions stored on computer-readable mediums. Additionally, embodiments may be implemented in the form of computer-programs, or a computer usable storage medium capable of storing such a program.

"E-books" are a form of electronic publication content stored in digital format in a computer non-transitory memory, viewable on a computing device having display functionality. An e-book can correspond to, or mimic, the paginated format of a printed publication for viewing, such as provided by printed literary works (e.g., novels) and periodicals (e.g., magazines, comic books, journals, etc.). Optionally, some e-books may have chapter designations, as well as content that corresponds to graphics or images (e.g., such as in the case of magazines or comic books). Multi-function devices, such as cellular-telephony or messaging devices, can utilize specialized applications (e.g., specialized e-reading application software) to view e-books in a format that mimics the paginated printed publication. Still further, some devices (sometimes labeled as "e-readers"can display digitally-stored content in a more reading-centric manner, while also providing, via a user input interface, the ability to manipulate that content for viewing, such as via discrete pages arranged sequentially (that is, pagination) corresponding to an intended or natural reading progression, or flow, of the content therein.

An "e-reading device", also referred to herein as an electronic personal display, can refer to any computing device that can display or otherwise render an e-book. By way of example, an e-reading device can include a mobile computing device on which an e-reading application can be executed to render content that includes e-books (e.g., comic books, magazines, etc.). Such mobile computing devices can include, for example, a multi-functional computing device for cellular telephony/messaging (e.g., feature phone or smart phone), a tablet computer device, an ultra-mobile computing device, or a wearable computing device with a form factor of a wearable accessory device (e.g., smart watch or bracelet, glass-wear integrated with a computing device, etc.). As another example, an e-reading device can include an e-reader device, such as a purpose-built device that is optimized for an e-reading experience (e.g., with E-ink displays).

FIG. 1 illustrates a system 100 for utilizing applications and providing e-book services on a computing device, according to an embodiment. In an example of FIG. 1, system 100 includes an electronic personal display device, shown by way of example as an e-reading device 110, and a network service 121. The network service 121 can include multiple servers and other computing resources that provide various services in connection with one or more applications that are installed on the e-reading device 110. By way of example, in one implementation, the network service 121 can provide e-book services that communicate with the e-reading device 110. The e-book services provided through network service 121 can, for example, include services in which e-books are sold, shared, downloaded and/or stored. More generally, the network service 121 can provide various other content services, including content rendering services (e.g., streaming media) or other network-application environments or services.

The e-reading device 110 can correspond to any electronic personal display device on which applications and application resources (e.g., e-books, media files, documents) can be rendered and consumed. For example, the e-reading device 110 can correspond to a tablet or a telephony/messaging device (e.g., smart phone). In one implementation, for example, e-reading device 110 can run an e-reader application that links the device to the network service 121 and enables e-books provided through the service to be viewed and consumed. In another implementation, the e-reading device 110 can run a media playback or streaming application that receives files or streaming data from the network service 121. By way of example, the e-reading device 110 can be equipped with hardware and software to optimize certain application activities, such as reading electronic content (e.g., e-books). For example, the e-reading device 110 can have a tablet-like form factor, although variations are possible. In some cases, the e-reading device 110 can also have an E-ink display.

In additional detail, the network service 121 can include a device interface 128, a resource store 122 and a user account store 124. The user account store 124 can associate the e-reading device 110 with a user and with an account 125. The account 125 can also be associated with one or more application resources (e.g., e-books), which can be stored in the resource store 122. The device interface 128 can handle requests from the e-reading device 110, and further interface the requests of the device with services and functionality of the network service 121. The device interface 128 can utilize information provided with a user account 125 in order to enable services, such as purchasing downloads or determining what e-books and content items are associated with the user device. Additionally, the device interface 128 can provide the e-reading device 110 with access to the content store 122, which can include, for example, an online store. The device interface 128 can handle input to identify content items (e.g., e-books), and further to link content items to the account 125 of the user.

Yet further, the user account store 124 can retain metadata for individual accounts 125 to identify resources that have been purchased or made available for consumption for a given account. The e-reading device 110 may be associated with the user account 125, and multiple devices may be associated with the same account. As described in greater detail below, the e-reading device 110 can store resources (e.g., e-books) that are purchased or otherwise made available to the user of the e-reading device 110, as well as to archive e-books and other digital content items that have been purchased for the user account 125, but are not stored on the particular computing device.

With reference to an example of FIG. 1, e-reading device 110 can include a display screen 116 and an optional housing (not shown). In an embodiment, the display screen 116 is touch-sensitive, to process touch inputs including gestures (e.g., swipes). For example, the display screen 116 may be integrated with one or more touch sensors 138 to provide a touch-sensing region on a surface of the display screen 116. For some embodiments, the one or more touch sensors 138 may include capacitive sensors that can sense or detect a human body's capacitance as input. In the example of FIG. 1, the touch sensing region coincides with a substantial surface area, if not all, of the display screen 116. Additionally, a housing can also be integrated with touch sensors to provide one or more touch sensing regions, for example, on the bezel and/or back surface of the housing.

In some embodiments, the e-reading device 110 includes features for providing functionality related to displaying paginated content. The e-reading device 110 can include page transitioning logic 115, which enables the user to transition through paginated content. The e-reading device 110 can display pages from e-books, and enable the user to transition from one page state to another. In particular, an e-book can provide content that is rendered sequentially in pages, and the e-book can display page states in the form of single pages, multiple pages or portions thereof. Accordingly, a given page state can coincide with, for example, a single page, or two or more pages displayed at once. The page transitioning logic 115 can operate to enable the user to transition from a given page state to another page state In the specific example embodiment where a given page state coincides with a single page, for instance, each page state corresponding to one page of the digitally constructed series of pages paginated to comprise, in one embodiment, an e-book. In some implementations, the page transitioning logic 115 enables single page transitions, chapter transitions, or cluster transitions (multiple pages at one time).

The page transitioning logic 115 can be responsive to various kinds of interfaces and actions in order to enable page transitioning. In one implementation, the user can signal a page transition event to transition page states by, for example, interacting with the touch-sensing region of the display screen 116. For example, the user may swipe the surface of the display screen 116 in a particular direction (e.g., up, down, left, or right) to indicate a sequential direction of a page transition. In variations, the user can specify different kinds of page transitioning input (e.g., single page turns, multiple page turns, chapter turns, etc.) through different kinds of input. Additionally, the page turn input of the user can be provided with a magnitude to indicate a magnitude (e.g., number of pages) in the transition of the page state. For example, a user can touch and hold the surface of the display screen 116 in order to cause a cluster or chapter page state transition, while a tap in the same region can effect a single page state transition (e.g., from one page to the next in sequence). In another example, a user can specify page turns of different kinds or magnitudes through single taps, sequenced taps or patterned taps on the touch sensing region of the display screen 116. Although discussed in context of "taps" herein, it is contemplated that a gesture action provided in sufficient proximity to touch sensors of display screen 116, without physically touching thereon, may also register as a "contact" with display screen 116, to accomplish a similar effect as a tap, and such embodiments are also encompassed by the description herein.

According to some embodiments, the e-reading device 110 includes display sensor logic 135 to detect and interpret user input or user input commands made through interaction with the touch sensors 138. By way of example, display sensor logic 135 can detect a user making contact with the touch-sensing region of the display screen 116, otherwise known as a touch event. More specifically, display sensor logic 135 can detect a touch events also referred to herein as a tap, an initial tap held in sustained contact, or sufficiently in proximity to register a "contact", with display screen 116 (otherwise known as a "long press"), multiple taps performed either sequentially or generally simultaneously, swiping gesture actions made through user interaction with the touch sensing region of the display screen 116, or any combination of these gesture actions. Furthermore, display sensor logic 135 can interpret such interactions in a variety of ways. For example, each such interaction may be interpreted as a particular type of user input associated with a respective input command, execution of which may trigger a change in state of display 116.

In one implementation, display sensor logic 135 implements operations to monitor for the user contacting or superimposing upon, using a finger, thumb or stylus, a surface of display 116 coinciding with a placement of one or more touch sensor components 138, that is, a touch event, and also detects and correlates a particular gesture (e.g., pinching, swiping, tapping, etc.) as a particular type of input or user action. Display sensor logic 135 may also sense directionality of a user gesture action so as to distinguish between, for example, leftward, rightward, upward, downward and diagonal swipes along a surface portion of display screen 116 for the purpose of associating respective input commands therewith.

Text Marginating module 120 can be implemented as a software module comprising instructions stored in a memory of mobile computing device 110, as described in further detail below with regard to FIG. 2.

Figure 2:
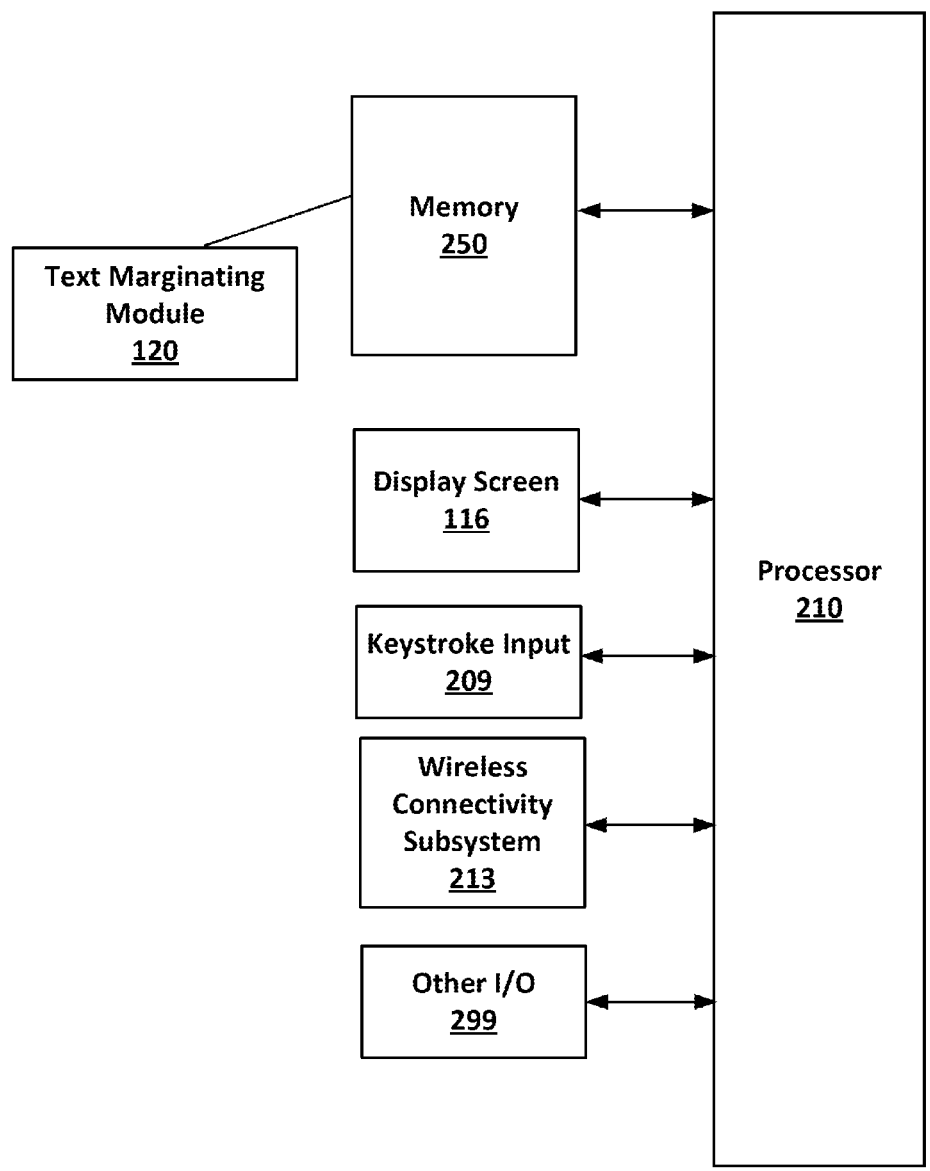
FIG. 2 illustrates an example architecture configuration of a computing device configured for re-marginating displayed content in a manner that counteracts obscuration thereof according to an embodiment.

FIG. 2 illustrates further detail of e-reading device 110 as described above with respect to FIG. 1, in an embodiment architecture. E-reading device 110 further includes processor 210, a memory 250 storing instructions and logic pertaining at least to display sensor logic 135 and Text Marginating module 114.

Processor 210 can implement functionality using the logic and instructions stored in memory 250. Additionally, in some implementations, processor 210 utilizes the network interface 220 to communicate with the network service 121 (see FIG. 1). More specifically, the e-reading device 110 can access the network service 121 to receive various kinds of resources (e.g., digital content items such as e-books, configuration files, account information), as well as to provide information (e.g., user account information, service requests etc.). For example, e-reading device 110 can receive application resources 221, such as e-books or media files, that the user elects to purchase or otherwise download via the network service 121. The application resources 221 that are downloaded onto the e-reading device 110 can be stored in memory 250.

In some implementations, display 116 can correspond to, for example, a liquid crystal display (LCD) or light emitting diode (LED) display that illuminates in order to provide content generated from processor 210. In some implementations, display 116 can be touch-sensitive. For example, in some embodiments, one or more of the touch sensor components 138 may be integrated with display 116. In other embodiments, the touch sensor components 138 may be provided (e.g., as a layer) above or below display 116 such that individual touch sensor components 138 track different regions of display 116. Further, in some variations, display 116 can correspond to an electronic paper type display, which mimics conventional paper in the manner in which content is displayed. Examples of such display technologies include electrophoretic displays, electro-wetting displays, and electro-fluidic displays.

Processor 210 can receive input from various sources, including touch sensor components 138, display 116, keystroke input 209 such as from a virtual or rendered keyboard, and other input mechanisms 299 (e.g., buttons, mouse, microphone, etc.). With reference to examples described herein, processor 210 can respond to input detected at the touch sensor components 138. In some embodiments, processor 210 responds to inputs from the touch sensor components 138 in order to facilitate or enhance e-book activities such as generating e-book content on display 116, performing page transitions of the displayed e-book content, powering off the device 110 and/or display 116, activating a screen saver, launching or closing an application, and/or otherwise altering a state of display 116.

In some embodiments, memory 250 may store display sensor logic 135 that monitors for user interactions detected through the touch sensor components 138, and further processes the user interactions as a particular input or type of input. In an alternative embodiment, display sensor logic module 135 may be integrated with the touch sensor components 138. For example, the touch sensor components 138 can be provided as a modular component that includes integrated circuits or other hardware logic, and such resources can provide some or all of display sensor logic 135. In variations, some or all of display sensor logic 135 may be implemented with processor 210 (which utilizes instructions stored in memory 250), or with an alternative processing resource.

E-reading device 110 further includes wireless connectivity subsystem 213, comprising a wireless communication receiver, a transmitter, and associated components, such as one or more embedded or internal antenna elements, local oscillators, and a processing module such as a digital signal processor (DSP) (not shown). As will be apparent to those skilled in the field of communications, the particular design of wireless connectivity subsystem 213 depends on the communication network in which computing device 110 is intended to operate, such as in accordance with Wi-Fi, Bluetooth, Near Field Communication (NFC) communication protocols, and the like.

Text Marginating module 120 can be implemented as a software module, comprising instructions stored in memory 250, on mobile computing device 110. One or more embodiments of Text Marginating module 120 described herein may be implemented using programmatic modules or components, a portion of a program, or software in conjunction with one or more hardware component(s) capable of performing one or more stated tasks or functions. As used herein, such module or component can exist on a hardware component independently of other modules or components. Alternatively, a module or component can be a shared element or process of other modules, programs or machines.

Figure 3:
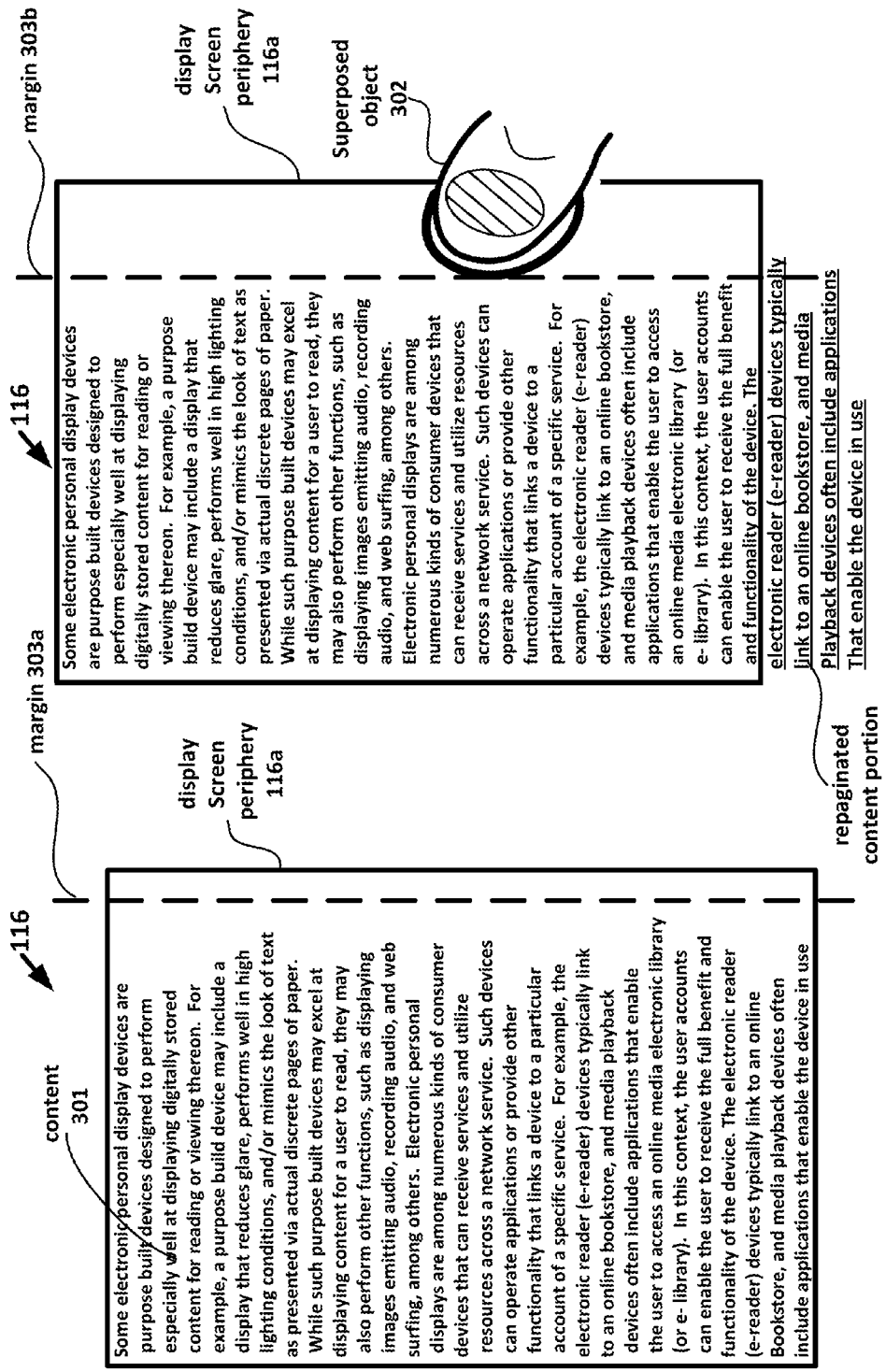
FIGS. 3(a) and (b) illustrate an example configuration in an operation to re-marginate displayed content in a manner that counteracts obscuration thereof, according to an embodiment.

With reference now to FIGS. 3(*a*)(*b*), and more specifically, FIG. 3(*a*) in conjunction with FIG. 3(*b*), an embodiment implementation of Text Marginating module 120 in operation of computing device 110 is described in further detail.

In FIG. 3(*a*), display screen 116 of computing device 110 includes touch functionality whereby text content 301 comprises a display of a digitally rendered page among a series or sequence of digitally constructed pages forming an e-book. For an electronic book (e-book), the page may displayed in distinct, separate pages, paginated sequentially to mimic successive pages of a printed paper book, for example. The text content 301 further comprises lines of text for reading by an observer or reader, the text having text attributes, such as, but not limited to, a font size, a font type, a spacing between the lines, a spacing between words of text, and a margin space around text content 301 comprising the distances from the left, right, top and bottom margins of the electronic page to text content 301. In the example depicted in FIG. 3(*a*), it is apparent that a natural or intended reading progression for an observer viewing display screen 116 would be to start from upper left-most word, then read lines in sequential order until reaching the bottom-right-most text word. It is contemplated that the displayed page of text content 301 may further include one or more graphic image(s) interspersed within the lines of text (not depicted). It is apparent that text margin 116*a* provides a virtual line by which text content 301 is offset from display screen periphery 116*a*.

FIG. 3(*b*) shows a superposed object 302, such as via an observer's finger, thumb or a stylus device, received at computing device 110 upon display 116, sensed via touch sensors 138. While superposed object 302 is depicted as superposed over a right periphery or side of text context content 301, it is contemplated that superposed object 302 may instead be similarly positioned on any side or periphery—top, bottom or left—of text content 301.

The handedness of the computing device may be determined based on a time duration of superposed object remaining in contact at display screen 116 along display screen periphery 116*a* according to the embodiment depicted in FIG. 3(*a*). In the embodiment shown, a duration threshold of 1 second may apply, the maintaining of contact beyond which supports and leads to a determination that the observer is "right-handed", in the example along display screen periphery 116*a*.

Text Marginating module 120 may then be triggered operate to re-arrange display of lines of text content 301, in order to counteract obscuration of said content by superposed object 302, for satisfactory and convenient reading or viewing.

Text Marginating module 120 operates to calculate and position a new margin, shown as keep out margin 303*b* in the example depiction of FIG. 3(*b*), such that viewing of content 301 would not be obstructed, in the example of FIG. 3(*b*)). It is apparent that keep out margin 303*b* is wider than original virtual margin 303*a*, as measured from display screen periphery 116*a*.

Text keep out margin 303*b* can be calculated or determined via Text Marginating module 120, based on the shape and size of superposed object 302, and to establish a minimum-sized keep out zone to one side about superposed object 302 beyond which text content 301 may be easily read or viewed by an observer. The size of the text keep out margin may be configurable by the observer, such as via device setting menu, using rules that allow for selection of an appropriate one of various keep out margin size options, to account for unusually large or small superposed objects 302, or according to observer preferences. Text keep out margin 303*b* may or may not be rendered visually on display screen 116. If rendered visually, text keep out margin 303*b* may be depicted using visual options such a line of noticeable depth or translucency, a solid or a observable fluctuating color(s), a variation in display brightness or contrast relative to text context 301, or any combination thereof Integral to the re-marginating of content about keep out margin 303*b*, lines of content 301 are re-wrapped, or re-formatted, to flow around text keep out margin 303*b* while maintaining original text attributes such as font size, text spacing, word spacing, etc., for continuity in appearance for viewing by the observer. Referring to the specific example embodiment depicted in FIG. 3(*b*), a consequent effect of such line-wrapping accordingly requires repagination of content text portion 307 into a next page of the series of digitally constructed pages forming the e-book, since content portion 307 is no longer viewable on display screen 116, and instead is repaginated by way of incorporating into the next page in the sequence of digitally constructed pages comprising the e-book being read by the observer.

In this manner, Text Marginating module 120 operates to repaginate digitally constructed e-book pages, as the above described manipulation of repaginated text portion 306 of text content 301 conceivably ripples throughout a series of following or subsequent digitally constructed pages of the e-book being viewed or read one page at a time, in anticipation of the determined handedness of the user or observer. In this manner the next page is reconstructed, with the keep out margin being applied to that next page as well.

Yet further, in an embodiment where the computing device comprises an electronic reading device displaying paginated content comprising an e-magazine or e-comic book at the display screen, it is contemplated that the device memory further stores instructions to enact corresponding operations where one or more image(s), including graphical images(s), are interspersed within text content 301, or form a predominant portion of content for rendering on display screen 116.

Figure 4:
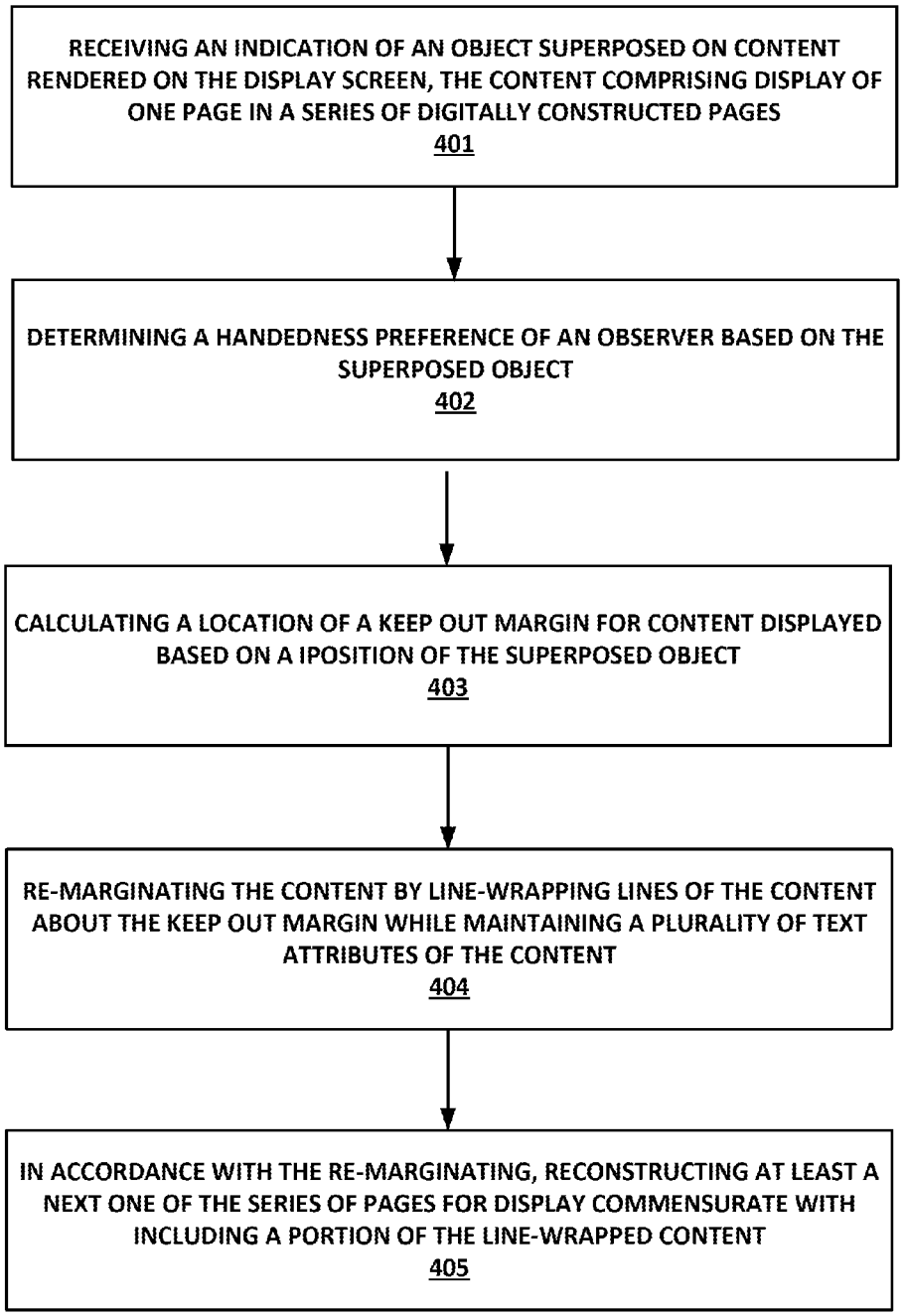
FIG. 4 illustrates a method of operating a computing device to re-marginate displayed content in a manner that counteracts obscuration thereof, according to an embodiment.

FIG. 4 illustrates an example method 400 implemented by processor 210 of computing device 110 for providing an operation to shift content or manipulate content under display, such as e-book pages arranged sequentially, to counteract any obscuration thereof, with appropriate repagination of following content therein, according to an embodiment using elements such as described with prior examples, including those of FIGS. 1-3(*b*) herein.

At step 401, receiving an indication of an object 302 superposed on content 301 rendered on the display screen 116, the content comprising display of one page in a series of digitally constructed pages.

At step 402, determining a handedness preference of an observer based on the position of the object;

At step 403, calculating a keep out margin 303*b* around the superposed object 302, the keep out margin 303*a* being positioned such that the content 301 is viewable when rendered to a side thereof.

At step 404, re-marginating the content by line-wrapping lines of the content around the keep out margin 303*b* while maintaining a plurality of text attributes of the content 301.

At step 405, reconstructing a next one of the series of pages for display in accordance with the re-margination by including at least a portion of the content 306 thereinto.

Although illustrative embodiments have been described in detail herein with reference to the accompanying drawings, variations to specific embodiments and details are contemplated and encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method executed in a processor of a computing device, the computing device further including a memory storing instructions and a display screen having touch functionality, the method comprising:
   receiving indication of an object superposed on content rendered on the display screen, the content comprising display of one page in a series of digitally constructed pages;
   determining a handedness preference based on a position of the object on the content;
   calculating a location of a keep out margin for the content, the margin being located based on the handedness preference such that the content is viewable as rendered to a side thereof;
   in response to receiving the indication of the object superposed on the content rendered on the display screen, automatically calculating the keep out margin based on a shape and a size of the superposed object, the keep out margin establishing a minimum-sized keep out zone to a side of the superposed object, wherein the keep out margin spans a vertical length of the display screen;
   re-marginating the content by line-wrapping lines of the content about the keep out margin while maintaining a plurality of text attributes of the content; and
   reconstructing a next one of the series of pages for display in accordance with the remargination by including at least a portion of the line-wrapped content thereinto.

2. The method of claim 1 wherein the content comprises text content.

3. The method of claim 2 wherein the content further comprises one or more images interspersed among the text content.

4. The method of claim 1 wherein the object is superposed over a periphery of the content rendered on the display screen.

5. The method of claim 1 wherein the keep out margin is visually rendered.

6. The method of claim 5 wherein the visual rendering comprises one of: a line depth visually contrasting with the content, a color different from the content and a graphic element having visually observable fluctuating intensity.

7. The method of claim 1 wherein the object superposed on the content is one of: a thumb, a stylus and a finger digit.

8. The method of claim 1 wherein the computing device comprises an electronic reading device displaying paginated content at the display screen.

9. The method of claim 1 wherein the plurality of text attributes are selected from a group of text attributes consisting of: a font size, a word spacing, a line spacing, and a font type.

10. The method of claim 1 wherein the next page as reconstructed includes at least a last line of the content existing prior to the re-margination.

11. The method of claim 1, wherein the handedness preference is determined based on a time duration of the object remaining in contact with the display screen.

12. A non-transitory computer-readable medium that stores instructions for a computing device, the computing device including a processor, a memory and a display screen having touch functionality, the instructions being executable by the processor to cause the computing device to perform operations that include:
   receiving indication of an object superposed on content rendered on the display screen, the content comprising display of one page in a series of digitally constructed pages;
   determining a handedness preference based on a position of the object on the content;
   calculating a location of a keep out margin for the content, the margin being located based on the handedness preference such that the content is viewable as rendered to a side thereof;
   in response to receiving the indication of the object superposed on the content rendered on the display screen, automatically calculating the keep out margin based on a shape and a size of the superposed object, the keep out margin establishing a minimum-sized keep out zone to a side of the superposed object, wherein the keep out margin spans a vertical length of the display screen;
   re-marginating the content by line-wrapping lines of the content about the keep out margin while maintaining a plurality of text attributes of the content; and
   reconstructing a next one of the series of pages for display in accordance with the re-margination by including at least a portion of the line-wrapped content thereinto.

13. A computing device comprising:
   a memory that stores a set of instructions;
   a display screen having touch functionality;
   a processor that access the instructions in memory, the processor further configured to:
      receive indication of an object superposed on content rendered on the display screen, the content comprising display of one page in a series of digitally constructed pages;

determine a handedness preference based on a position of the object on the content;

calculate a location of a keep out margin for the content, the margin being located based on the handedness preference such that the content is viewable as rendered to a side thereof;

in response to receiving the indication of the object superposed on the content rendered on the display screen, automatically calculate the keep out margin based on a shape and a size of the superposed object, the keep out margin establishing a minimum-sized keep out zone to a side of the superposed object, wherein the keep out margin spans a vertical length of the display screen;

re-marginate the content by line-wrapping lines of the content about the keep out margin while maintaining a plurality of text attributes of the content; and reconstruct a next one of the series of pages for display in accordance with the re-margination by including at least a portion of the line-wrapped content thereinto.

14. The computing device of claim 13 wherein the content comprises text content.

15. The computing device of claim 14 wherein the content further comprises one or more images interspersed among the text content.

16. The computing device of claim 13 wherein the object is superposed over a periphery of the content rendered on the display screen.

17. The computing device of claim 13 wherein the keep out margin is visually rendered.

18. The computing device of claim 17 wherein the visual rendering comprises one of: a line depth visually contrasting with the content, a color different from the content and a graphic element of fluctuating intensity.

19. The computing device of claim 13 wherein the object superposed on the content is one of: a thumb, a stylus and a finger digit.

20. The computing device of claim 13 wherein the computing device comprises an electronic reading device displaying paginated content at the display screen.

21. The computing device of claim 13 wherein the plurality of text attributes are selected from a group of text attributes consisting of: a font size, a word spacing, a line spacing, and a font type.

* * * * *